Figure 1:
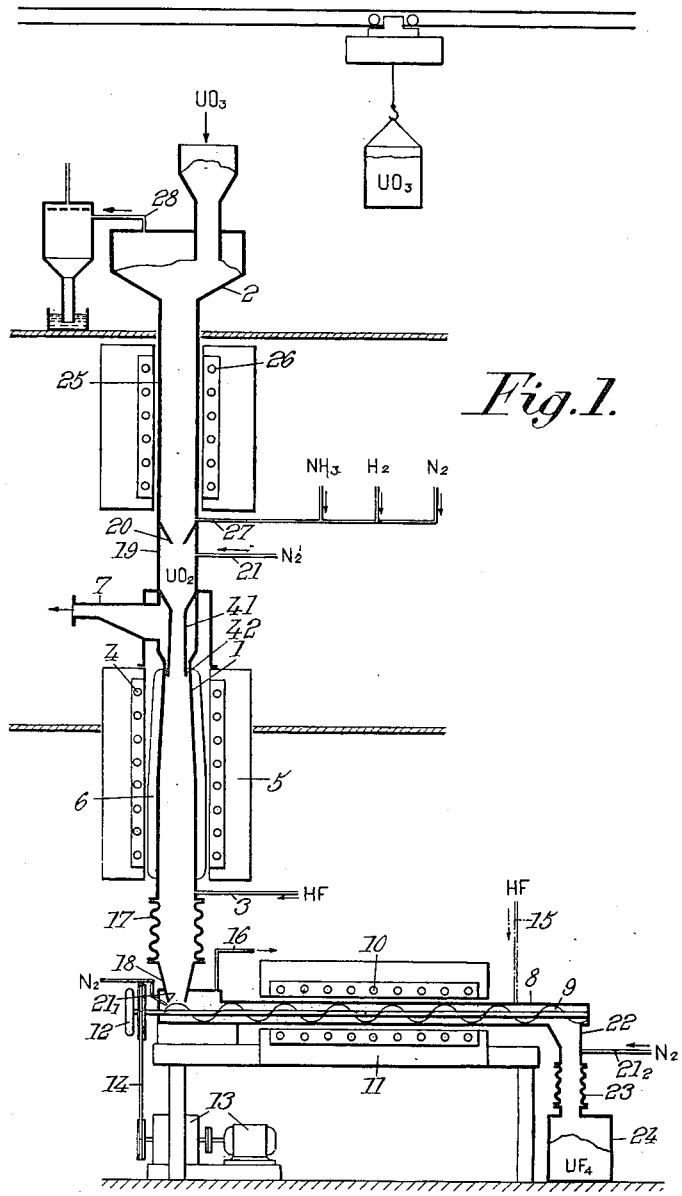

Aug. 3, 1965     M. DELANGE ETAL     3,198,598
METHODS AND APPARATUS IN WHICH A MASS OF SOLID MATERIAL
IS SUBJECTED TO TWO SUCCESSIVE TREATMENTS BY GASES
Filed Oct. 31, 1958     2 Sheets-Sheet 2
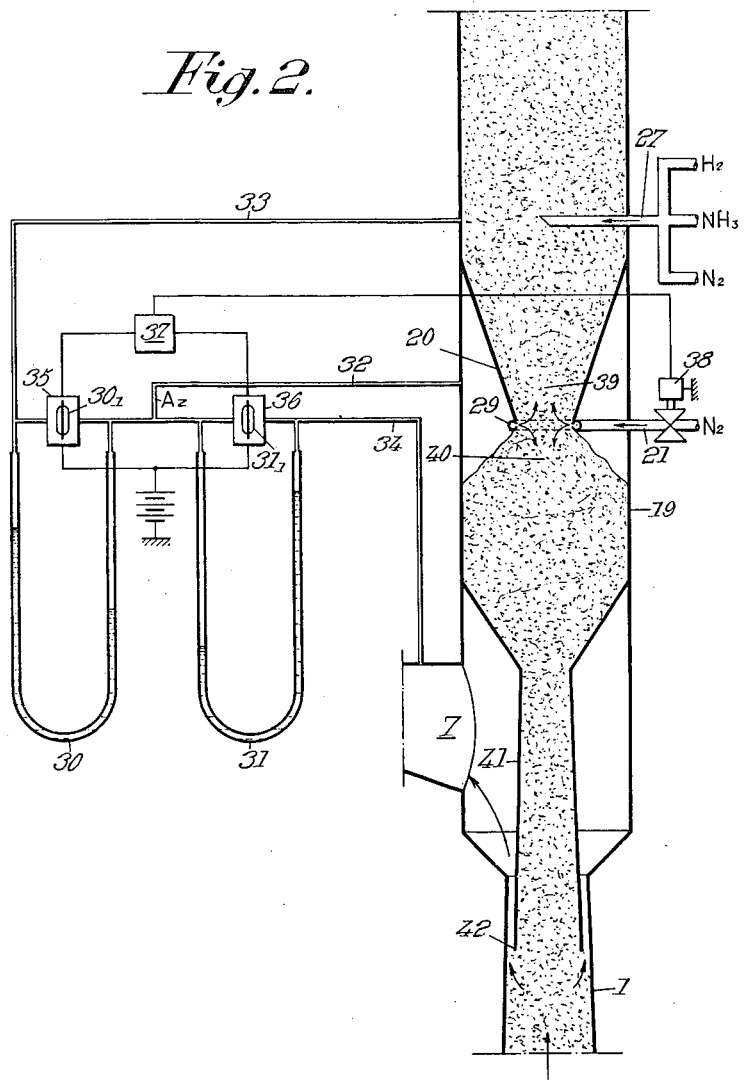
INVENTORS
MAURICE DELANGE
HENRI HUET
PAUL VERTES
BY
AGENT United States Patent Office 3,198,598
Patented Aug. 3, 1965

3,198,598
METHODS AND APPARATUS IN WHICH A MASS OF SOLID MATERIAL IS SUBJECTED TO TWO SUCCESSIVE TREATMENTS BY GASES
Maurice Delange, Ballancourt, Henri Huet, Saint-Vrain, and Paul Vertes, Mennecy, France, assignors to Commissariat à l'Energie Atomique, Paris, France, a French state administration
Filed Oct. 31, 1958, Ser. No. 771,029
Claims priority, application France, Nov. 5, 1957, 750,882
2 Claims. (Cl. 23—14.5)

The present invention relates to methods in which a mass of solid material is successively passed through two juxtaposed spaces connected with each other while a first treatment gas is circulated through the first of said spaces and a second treatment gas is circulated through the second of said spaces.

The object of this invention is to prevent each of said gases from passing from the space where it is circulated into the other treatment space.

For this purpose, the method according to our invention comprises injecting a third gas different from the two first mentioned gases, into the connection between these two spaces, said third gas being at a pressure higher than the respective pressures of said two first mentioned gases.

Another feature of our invention relates to the production of uranium fluoride and it consists essentially in starting from $UO_3$ and $U_3O_8$ uranium oxides, agglomerating said oxides into small pellets or the like, and reducing them so as to transform them into $UO_2$ uranium oxide.

Still another feature of the invention consists in the production of uranium fluoride from $UO_2$ uranium oxide and it consists, after passing pellets of uranium oxide through a column where they are subjected to the action of a stream of hydrofluoric acid and through which said pellets travel by gravity, in further subjecting the uranium fluoride obtained at the bottom end of this column to the supplementary action of a stream of hydrofluoric acid so as to obtain a complete reaction thereof on the remaining uranium oxide present in the product.

Preferred embodiments of the present invention will be hereinafter described with reference to the accompanying drawings given merely by way of example and in which:

FIG. 1 of the drawings shows, in diagrammatic vertical section, a plant for the treatment of uranium oxides for the obtainment of uranium fluoride.

FIG. 2 is a view, on an enlarged scale, of a portion of this plant.

It will be supposed, in the following description, that the invention is applied to the production of uranium fluoride, in particular by the method according to which uranium oxide $UO_2$, previously agglomerated in the form of pellets or the like, is fed to the upper portion of the body 1 of an oven called "fluoriding" oven 4, 5 (FIG. 1) in the form of a substantially vertical column, at the bottom end of which is collected the uranium fluoride to be obtained, a gaseous stream of hydrofluoric acid being fed at 3 and flowing out at 7. The reaction, which is an exothermic one, is maintained at a temperature ranging from 400 to 500° C. through cooling means such as the fins shown at 6.

The uranium oxide $UO_2$ which is subjected to this treatment must be prepared from $UO_3$ and $U_3O_8$ oxides, by reduction thereof under the action of a gas such as hydrogen, cracked ammonia gas or ammonia gas, either pure or mixed with these gases.

This reduction operation should be performed immediately before the $UO_2$ oxide that is obtained is fed to the fluoriding oven, said process being performed in continuous fashion, that is to say the solid material passing directly from the reducing oven to the fluoriding oven. But it is then necessary to provide means for preventing the residual gases leaving the fluoriding oven from passing into the reduction oven to react with the gases present therein, in particular with ammonia. The action of the hydrofluoric acid gases on ammonia gas would produce ammonium fluoride $FNH_4$ which, when cooling down in the outflow pipes, would crystallize and clog these pipes. One of the objects of the present invention is to provide methods and means for preventing such a mixing of the gases used in the two successive treatments of the solid materials.

The reduction operation is performed in an oven to which pellets or grains of $UO_3$ or $U_3O_8$ are fed, these pellets being for instance of a diameter of about 12 mm. and of a thickness ranging from 4 to 5 mm. The pressure under which said pellets are agglomerated must be sufficient to ensure a good agglomeration and a suitable mechanical resistance. This pressure must be higher than 100 kg. per sq. cm. and it may be for instance of 500 kg. per sq. cm. or even more.

These pellets are treated in the reduction oven, which is located immediately above the fluoriding oven.

On the drawing, the reduction oven is shown at 25, the pellets are fed thereto at 2. The heating means are shown at 26 and the reducing gases are supplied at 27, the residual gases flowing out at 28. The temperature of reduction may for instance range from 600 to 700° C., but this is merely an indication.

The fact that, due to the reduction of the $UO_3$ and $U_3O_8$ oxides, a certain amount of oxygen leaves the solid material, gives the bioxide that is formed a higher compactness and mechanical resistance.

The arrangement of the reduction oven immediately above the fluoriding oven is advantageous because it makes it possible to avoid any risk of reoxidation of the bioxide, $UO_2$, while it is being conveyed from the reducing oven to the fluoriding oven.

The means for preventing each of the gases circulated through ovens 25 and 5, respectively, from passing to the other of said ovens are made as will now be described (with particular reference to FIG. 2).

A connection casing 19 extends between the two ovens 25 and 5. In this casing 19, there is provided a funnel 20, forming an extension of the outlet or bottom end of tubular oven 1. The cross-section of this funnel 20 may be adjustable from the outside, so as to permit of adjusting the rate of flow of the solid material passing therethrough.

An inert gas, for instance nitrogen, is fed, in a direction transverse to the flow of uranium oxide, into the restricted section or bottom end of funnel 20, for instance through a distributing annular passage 29 provided with radial holes. This annular passage is fed with nitrogen under pressure through a conduit 21.

Manometric means are provided to give the pressure under which nitrogen is fed through passage 19 a value such that neither the reducing gases flowing at 27, nor the residual gases flowing out from body 1, can penetrate into casing 19.

Said manometric means include for instance a differential double manometer, for instance of the liquid type, the two elements of which are shown at 30, 31 (FIG. 2). They include a common branch connected at 32 to the central portion of casing 19 (and therefore measuring the nitrogen pressure $p$), and end branches connected at 33, 34, respectively, with the reduction oven and the fluoriding oven (therefore giving the respective pressures $p_1$ and $p_2$ in said ovens, in close proximity to casing 19).

For a good operation of the system, the pressure $p$ must be higher than both pressure $p_1$ and pressure $p_2$, which may be obtained either by a manual adjustment or by an automatic control.

In order to ensure an automatic control, the differential manometers are arranged as shown by FIG. 2 and constitute diaphragm manometers $30_1$, $31_1$ adapted to operate suitable contactos 35, 36 and, through a relay 37, an electro-valve 38 which controls the nitrogen pressure. As long as $p$ is higher than $p_1$ and $p_2$, contactors 35, 36 remain open. But, as soon as said pressure $p$ becomes lower than either $p_1$ or $p_2$, the corresponding contactor closes to actuate the electro-valve in the direction which causes an increase of the nitrogen pressure.

A system as above described permits of obtaining a continuous circulation, between ovens 25 and 5, of the mass of solenoid material constituted by the pellets, while preventing the gases which are circulated through each of said ovens from passing to the other one. The UO$_2$ pellets 39 (FIG. 2) flow down through funnel 20, under which they form a heap 40 in the lower part of casing 19. Then they pass into oven 1. Nitrogen fed through annular passage 29 is divided into two streams which both flow through the masses of pellets, one of these streams being directed upwardly, that is to say toward the reduction oven and the other being directed downwardly, that is to say toward the top end of the fluoriding oven, from which it escapes toward 7 together with the residual gases from this last mentioned oven.

At the outlet end of casing 19, the UO$_2$ pellets enter the fluoriding oven, either directly or, as shown on the drawings, through a feed conduit 41 (advantageously including a convergent upper part and a divergent lower part) through which a stream of nitrogen also passes so as to escape, together with the residual gases from oven 1, through an annular interval 42 in communication with the outflow or discharge chamber 7. The branch 34 of manometer 31 may be connected with said chamber 7, but it might be connected to any other space in communication with oven 1.

Experience has taught that the purity obtained with a fluoriding oven such as above described is not yet sufficient, in particular when magnesothermy is used for the final extraction of uranium from uranium fluoride. It is therefore necessary, in this case, to proceed to a supplementary treatment of the resulting product by means of fresh hydrofluoric acid.

Advantageously, the fluoride flowing out from the main fluoriding oven is made to pass through a continuous discharge system, in particular horizontal but possibly slightly inclined, through which fresh hydrofluoric acid gas is caused to flow in counter current relation to the solid material.

In the example shown by the drawings, evacuation of the uranium fluoride material is effected by means of a screw (sufficiently long to ensure the desired complementary reactions), but it might be constituted by vibrating or pulsing means.

On FIG. 1, means for performing this finishing treatment include a horizontal tube 8, a screw 9 for causing uranium fluoride to travel through said tube, an electric heating system 10 and heat insulating means 11. Screw 9 is controlled either manually at 12, or by a speed reducing gear and motor system 13, 14. Fresh hydrofluoric acid is fed at 15 and the residual gases flow out at 16.

Screw 9 serves both to propel the solid material through tube 8 and to stir it in the presence of the gas.

The connection with the main oven is ensured by means of a corrugated sleeve 17 which is capable of absorbing thermal expansions.

Furthermore, means for preventing the gases which are used, respectively in tube 8 and in oven 1, from passing each into the other of said elements are provided as above described. The feed of nitrogen to said means is shown at $21_1$ at the bottom end of a funnel-shaped member 18.

When leaving tube 8, the solid material drops at 22 into a container 24, through a coupling sleeve 23. In this case also, means such as above described may be used in order to prevent mixing of the gas present in tube 8 and of that present in chamber 24. The feed of nitrogen into said means is shown at $21_2$.

The various elements of the ovens and of the extracting mechanism are made of materials which are capable of resisting the action of the reagents, for instance of nickel or of Monel metal, the joints being made of material such as designated by the trademarks "Teflon" or "Hostaflon."

The provision of complementary treatment means such as 8, 9 permits not only of obtaining a purer fluoride, but also of improving the capacity of production without substantially increasing the consumption of hydrofluoric acid. The rate of flow through oven 5 can thus be increased, which is advantageous for the good operation thereof.

By way of indication, a horizontal tube 8, 3 meters long, heated over 1.5 meter and having a diameter of 15 cm., added to an oven such as shown at 5, makes it possible to raise the rate of production of the whole to more than 50 kg. per hour, giving a very pure product, practically free from oxygen (owing to the provision of the reducing oven). The presence of the nitrogen separating means also contributes in the obtainment of this very high purity, since it avoids parasitic reactions between different gases used in the processes.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. The method of preparing uranium fluoride from uranium oxides UO$_3$ and U$_3$O$_8$ which comprises, continuously feeding pellets of said uranium oxide into a vertical reaction zone having a base of reduced diameter, heating said zone at a temperature of about 600 to 700° C., passing a stream of reducing gas upwardly through said reduction zone in countercurrent to the downward movement of said pellets, providing a vertical fluorination zone below said reduction zone, continuously passing the uranium dioxide pellets obtained in said reduction zone through said fluorination zone, adjusting the temperature of said fluorination zone to about 400 to 500° C., passing hydrofluoric acid vapor upwardly through said fluorination zone in countercurrent to the movement of said pellets, recovering uranium fluoride pellets from the bottom of said fluorination zone, providing a blanket of nitrogen between said reduction zone and said fluorination zone, maintaining said blanket at a pressure higher than the pressure of the gases in said reduction zone and in said fluorination zone so as to prevent entry of the reduction gas into the fluorination zone and entry of the fluorination gases into the reduction zone, continuously supplying nitrogen under said higher pressure to said base of the reduction zone to maintain said blanket, withdrawing part of said nitrogen together with the upward flowing reducing gas, passing another part of said nitrogen downwardly, and withdrawing the same together with the gas leaving the fluorination zone, said reduction zone, nitrogen blanket and fluorination zone forming an uninterrupted coherent zone.

2. The method as claimed in claim 1 wherein said pellets are prepared by agglomerating said oxides under a pressure higher than 100 kg. per sq. cm.

References Cited by the Examiner

UNITED STATES PATENTS

| | | | |
|---|---|---|---|
| 1,218,588 | 3/17 | Barnett et al. | 23—264 X |
| 2,196,767 | 4/40 | Hasche | 23—277 |
| 2,351,214 | 6/44 | Kaufmann et al. | 23—288.3 |
| 2,561,331 | 7/51 | Barker | 23—288.3 |
| 2,630,373 | 3/53 | Grossman | 23—277 X |
| 2,811,413 | 10/57 | McMillan | 23—14.5 |
| 2,811,414 | 10/57 | Murphree | 23/14.5 |
| 2,972,513 | 2/61 | Mogard et al. | 23—14.5 |

OTHER REFERENCES

Goldschmidt et al.: Proceedings of the International Conference on Peaceful Uses of Atomic Energy, Aug. 8–20, 1955, vol. 80, pp. 152–155.

Shearer, MCW–7, Apr. 1, 1946 (date declass. Apr. 10, 1957), pp. 2–6, 12–18, 27–32, 42–47.

TID–7501 (pt), AEC document, pp. 33–59, 65–69, 117, February 1956.

CARL D. QUARFORTH, *Primary Examiner*.

ROGER L. CAMPBELL, MICHAEL A. BRINDISI, LEON R. ROSDOL, *Examiners*.